May 14, 1957   L. B. GRIFFITH   2,792,202
MILK WASTE TREATMENT
Filed March 26, 1954   3 Sheets-Sheet 2

INVENTOR
L. B. Griffith,
BY Henry H. Snelling
ATTORNEY

May 14, 1957 L. B. GRIFFITH 2,792,202
MILK WASTE TREATMENT

Filed March 26, 1954 3 Sheets-Sheet 3

INVENTOR
L. B. Griffith,
BY Henry H. Snelling
ATTORNEY

2,792,202
MILK WASTE TREATMENT

Llewellyn B. Griffith, Arlington, Va.

Application March 26, 1954, Serial No. 418,851

1 Claim. (Cl. 261—21)

This invention relates to milk waste treatment and has for its principal object the provision of a simple method of treating this product in an efficient and inexpensive manner.

The second object of the invention is to provide a milk waste treatment tank for handling this product by having a holding tank which may contain a full day's supply, and the treatment is had by allowing the product to run slowly thru the plant with or without recirculation from the effluent end to the incoming end and having an optional settling tank from which liquid may be transferred to the incoming end of the aerator.

For years the problem of treating milk waste has been a pressing one. Most small towns object strenuously to the dairies discharging milk waste into the municipal treatment plant and the objection is not difficult to understand especially when the waste has become stale. At best milk waste is difficult to treat and is high in B. O. D.

Naturally many attempts have been made to provide such treatment in the dairy so that the effluent can be sent to the municipal plant. The chemical method results in serious problems of sludge disposal. Biological treatment plants are excellent naturally but are much too expensive either to build or to operate except where no other method is possible. Usually in such biological methods a holding tank is provided which will hold the daily waste and then the waste is pumped into the secondary treatment during the following twenty-four hour period. The waste forms acid in absence of aeration and when acidified becomes even more difficult to treat. Where trickling filters are used they are necessarily placed at some considerable distance from the milk station because of the ever present odors and the presence of flies. The activated sludge method is used but in practice this method has been found difficult to operate. Better results are obtained by using the Hays (Patent 2,458,163) or other similar type of contact aerators including the use of a holding tank from which the day's supply is pumped thru the first stage aerator then allowed to settle, then thru the second stage aerator and finally into the settling tank. Here again the problem of sludge removal is serious and another obvious objection is the cost.

In the present system the principal involved is that if the liquid is forced to follow a certain tortuous path of great extent, the incoming warm milk waste will fill the entire space and will push in front of it the liquid which has previously been treated. If the incoming waste could be delivered constantly this would complete the process but since milk waste comes in widely spaced quantities, it is necessary to provide for a recirculation of the liquid thru the aerator by pumping material from the effluent end to the incoming end rather constantly during the time no new waste is being received.

Figure 1:
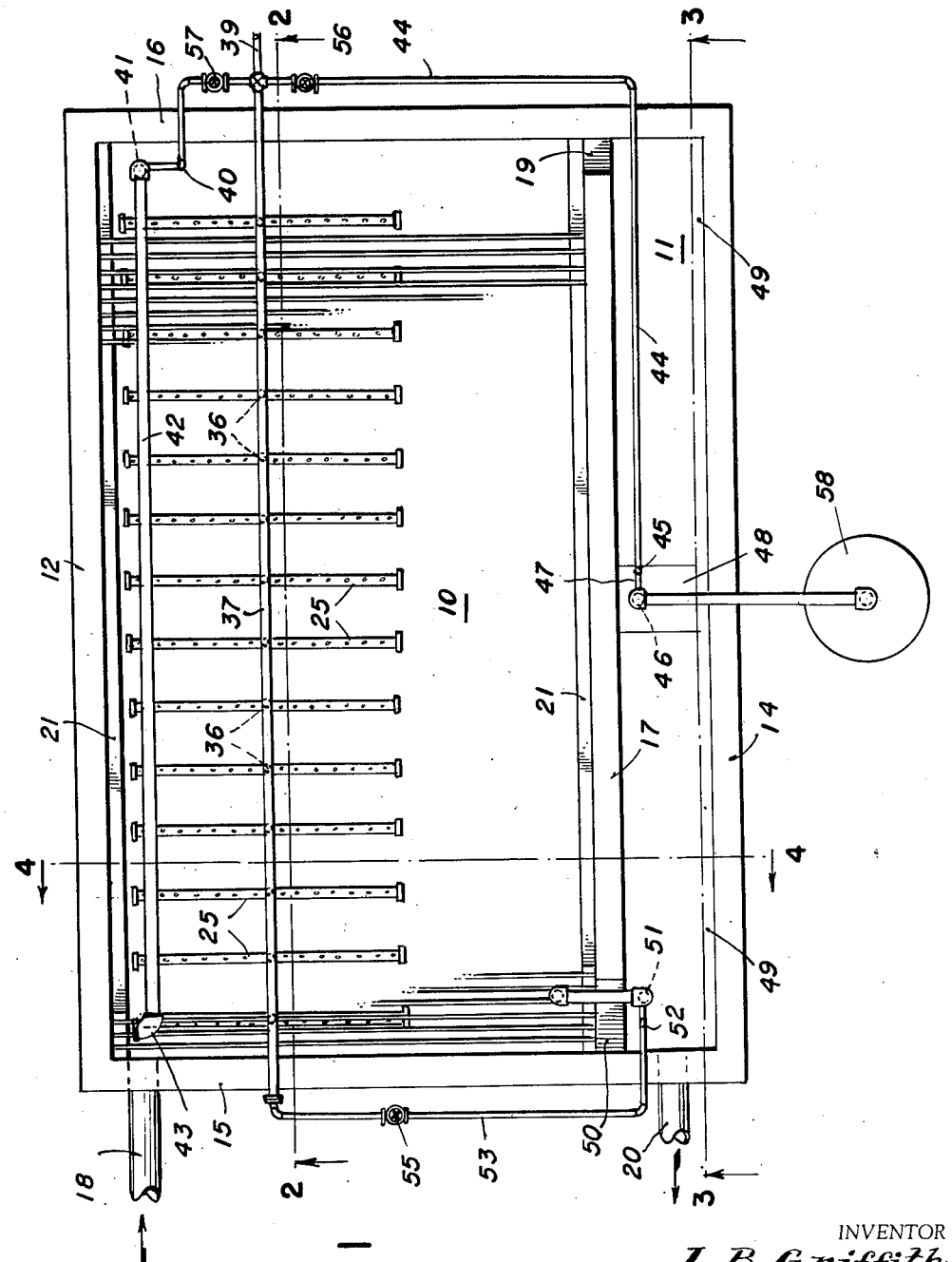
Figure 1 is a plan view.

In the preferred form of the invention I allow for treatment of waste beyond the rated capacity and in such case we add to the aerator 10 a settling tank 11, the former being essential and the latter being optional altho highly desirable. The tank, which may be of any material, for example concrete, consists of long sides 12 and 14 and short sides 15 and 16. The wall 17 would be the outside wall of the aerator if it were used alone and as shown forms the separating partition between the aerator 10 and the settling tank 11. The warm milk waste enters the tank thru the pipe 18, passes thru a wier 19 to the settling tank and is discharged thru an effluent pipe 20, when using the full system, whereas if the settling tank is omitted, the treated material would pass thru the weir 19 which would then become the effluent port.

Figure 4:
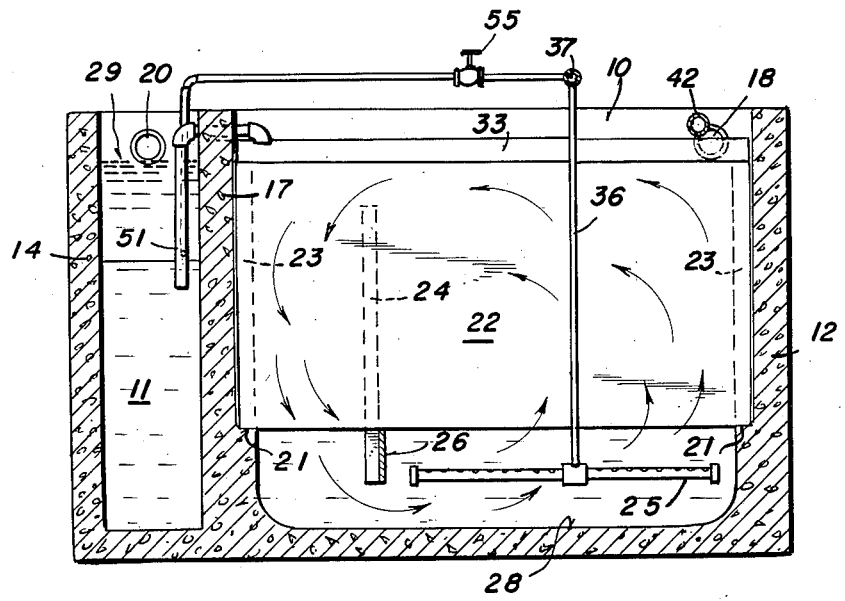
Figure 4 is a transverse vertical section on line 4—4 of Figure 1.
Figure 5:
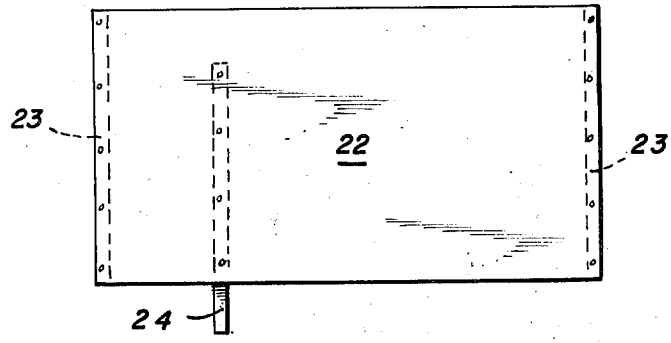
Figure 5 is a vertical elevation of a plate.

Referring particularly to Figures 1 and 4, the aerator walls 12 and 17 each have a ledge 21 which could be about three inches in horizontal depth and on these two ledges 21 rest a considerable plurality of plates 22. For clarity, each final plate of a compartment is numbered 32, these extending above the water line, while the initial plates of the compartments which engage the bottom and are well short of the water level are numbered 30. The plates are of three different types but each consists of a sheet of plywood or other suitable material conveniently about four feet deep and about twice as wide. At each end each plate has secured to it a spacer 23 and at a distance from one end of about one third or a fourth of the width of the tank is a second spacer numbered 24 as the function of the latter is quite different from that of the spacers 23, which are used solely to position the plates at the required distance apart, which is preferably an inch and a half, center to center, for a tank approximately 16 feet or so long. The plates 22 are usually one-fourth of an inch thick and the wood plate spacers are an inch and three-eighths thick and conveniently two inches wide. Both the end spacers 23 and the baffle spacers 24 are conveniently the same length as the depth of the plates 22.

Referring particularly to Figure 4, the baffle spacers 24 are displaced downwardly on the plates 22 so that their bottoms are on a line with the air diffuser tubes 25, there being one diffuser tube to each unit. Air is bubbled from the tube 25 in usual fashion so that the liquid rises throughout the entire area from the baffle spacer 24 to the wall 12. The baffle spacer 24, having its top lower than the top of plates 22, allows free flow over the top of the baffle 24 and consequently the liquid between the baffle 24 and the proximate wall 17 flows downwardly. The many baffle plates 24 where they project below the plates 22 do leave quarter-inch spaces between them corresponding to the widths of the plates but this is not objectionable in any way and to place small pieces of wood as shown at 26 across the baffle spaces 24 is usually quite unnecessary. It is preferred that each plate 22 shall be freely removable without disturbing any of the others.

Figure 2:
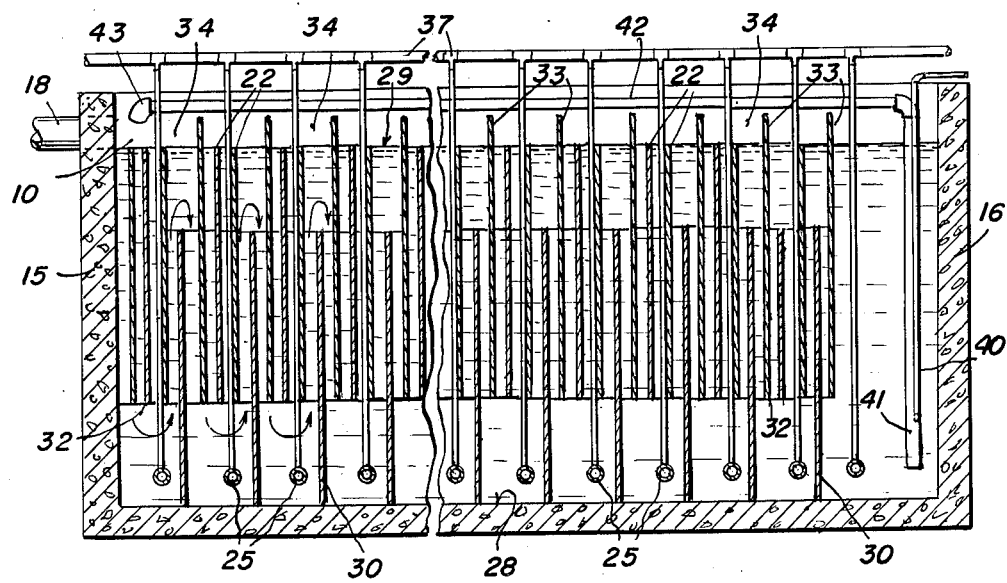
Figure 2 is a longitudinal vertical section on line 2—2 of Figure 1.

Referring now particularly to Figure 2, the length of the aerator 10 is divided into a number of compartments here shown as fourteen, the last compartment being different from the rest in having no plates 22. In each of the other compartments the final plate 30 extends from well below the water level 29 to the bottom surface 28 of the tank and these plates rest on the bottom and each carries at each side an end wood plate spacer 23 which rests on the ledge 21. Between the two plates 30, which form the opposite sides of any one unit or compartment, are the intermediate plates 22 here shown as two in number and the similar plate 32 which is fastened to its end spacers 23 so as to raise this initial plate of the compartment well above the water level 29, the elevated portion 33 preventing flow from left to right as seen in this figure at the top, while the space at the bottom of this plate 32 caused by the lowered elevation of the end spacer 23 permits the liquid to travel from left to right under the plate 32.

As has previously been described, the liquid between any two consecutive plates 22 is rotating in a counter-clockwise direction (see Fig. 4) over the baffles 24 from right to left and under the baffles 24 from left to right. The liquid is also traveling at a very much slower rate from left to right in Figure 2, hence it will be seen that the liquid is traveling in a helical path the convolutions being closely spaced, but very large in cross-section area, thus easily supplying over 80 square feet of surface for each pound of B. O. D. applied per day.

Figure 3:
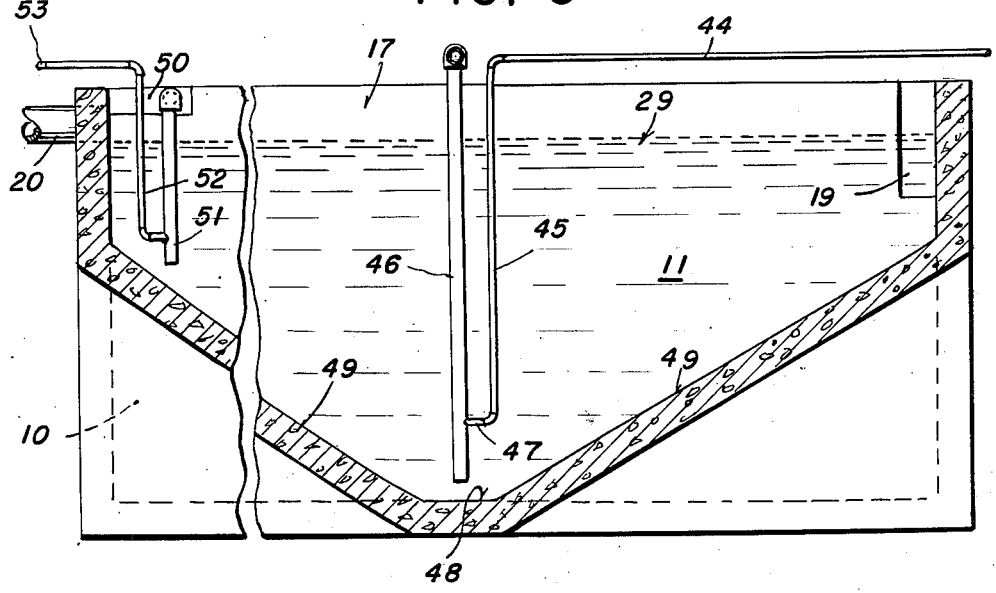
Figure 3 is a similar section thru the settling tank.

The air diffuser pipes 25 are of well known make and are supplied thru vertical pipes 36 coming from an elevated header 37, receiving its air from pipe 39. Main air pipe 39 leads thru pipe 40 to the bottom of an air lift 41, Figure 2, the horizontal component of which is numbered 42 and discharges thru an L 43 close to the wall 15 and above the water surface 29. A similar air pipe 44, Figures 1 and 3, leads to vertical pipe 45 discharging air near the bottom of the air lift 46 having its entry end 47 near the hopper bottom 48 of the settling tank 11 and discharging to a sludge can 58 to be removed at desirable intervals.

In the full embodiment of the invention the settling tank is of relatively short width but is the length of the tank 10. It has the usual sloping sides 49 and has a small port 50 below the top of the walls 15 and 17 but somewhat above the water level which is the same in both tanks. Thru this recess 50 passes a recirculating air lift 51 receiving air from pipes 52 and 53 directly connected to the air header pipe 37 and controlled by valve 55. Valves 56 and 57, like the valve 55, may be manually controlled but I prefer valves 55 and 56 to be controlled by solenoids which are time-operated and I prefer that the valve 57 normally be manually controlled but arranged so that it may be set to vary or entirely shut off in the daytime, for example, and to be in use constantly at night. This valve merely controls the quantity of liquid which is recirculated.

The purpose of recirculation is to dilute the liquid at the entry end. The time clocks controlling the valves are of well known type that can be set and the setting is necessarily governed by practical experience when the system is first put in use. Under normal conditions with no overload at all the aerator treats the milk waste so that when the new untreated milk waste arrives at the tank the effluent passing thru weir 19 will be practically pure water.

The settling tank 11 is purely a safeguard and its use or non-use would depend to some extent on financial considerations because by passing the liquid thru the aerator a greater number of times we can purify all of the waste. Under other circumstances it is a bit cheaper to take out some of the material as sludge and this is readily possible after the material has passed thru the aerator. In case of appreciable overload the settling tank is a very important safeguard and removes the settleable solids thereby increasing the capacity of the plant to that same extent. The settling tank 11 may be put in use by the valve 56 to run during the night and not to operate during the daytime when fresh milk waste is being received thru pipe 18.

Briefly the operation is as follows, understanding that the system has gone thru the usual ripening period and a film has formed on the plates so that these carry the bacteria and other micro-organisms which are normal inhabitants of such sewage and which in their continuous feeding constantly break down the rather complex organic materials of the milk waste into fairly simple and stable elements. The day's supply of warm milk waste enters thru pipe 18 and moves thru the aerator 10 in a convoluted path rotating laterally in the tank thru each one of the units or compartments in turn and finally passing to the compartment which has an air diffuser tube 25 but does not have any plates. In normal underload conditions clear liquid is discharged thru port 19 in the morning with the advent of new waste. A chosen amount of liquid is constantly transferred from the effluent end to the entry and thru pipe 42, the amount dependent upon the load expected. When the load is greater than normal, treated liquid passes thru the port 19 to the settling tank with a detention period of about twenty minutes. The sludge from the partially treated material settles to the bottom 48 and is drawn off at regular intervals depending upon the clock setting to govern the valve 56. This would probably be at four hour intervals. At the same time air is admitted to the air lift 51 depending upon the setting of valve 55 and this removes liquid, usually substantially water, from the exit end of settling tank 11 and delivers it to the initial end of the aerator tank 10 thus substantially doubling the capacity of the plant.

What I claim is:

A milk waste treating tank including a series of consecutive compartments and a final chamber having discharge means, each compartment comprising a plurality of intermediate plates transverse of the tank extending from side to side of the tank, roughly to the water level at the top and terminating well short of the bottom of the tank, an initial plate extending parallel to the intermediate plates and from side to side of the tank but extending well above the water line and terminating well short of the bottom of the tank, and a final plate extending to the bottom and both sides of the tank and having its top beneath the water level of the tank, baffle means in the compartment longitudinally of the tank, and an air diffuser parallel to and between two of the intermediate plates and located entirely to one side of the baffle means, whereby air from the diffuser will cause the milk waste to flow under the initial plate, over the final plate and to flow in a helical path between successive plates as it passes thru the compartment; and means for transferring fluid from the final chamber to the entry end of the tank, said means including a valve whereby recirculation may be confined to periods of non-receipt of milk waste into the system.

References Cited in the file of this patent

UNITED STATES PATENTS

| | | |
|---|---|---|
| 2,258,398 | Ward | Oct. 7, 1941 |
| 2,389,357 | Griffith | Nov. 20, 1945 |
| 2,458,163 | Hays | Jan. 4, 1949 |
| 2,517,792 | Kraus | Aug. 8, 1950 |
| 2,616,848 | Griffith | Nov. 4, 1952 |
| 2,653,907 | Griffith | Sept. 29, 1953 |

OTHER REFERENCES

Applied Microbiology, Porges et al., vol. 1, No. 5, September 1952, pp. 262–270.